Patented Aug. 13, 1940

2,211,705

UNITED STATES PATENT OFFICE 2,211,705

PROCESS FOR TREATMENT OF FRIEDEL-CRAFTS REACTION LIQUORS

Harold A. Robinson, Midland, Mich., assignor to The Dow Chemical Company, Midland, Mich., a corporation of Michigan No Drawing. Application February 15, 1939, Serial No. 256,601

8 Claims. (Cl. 260—671)

The present invention relates to a process for the removal of dispersed organo-metal halide complex catalysts from Friedel-Crafts reaction liquors.

As is well known, the active catalyst in a Friedel-Crafts reaction is not the metal halide originally added, but is an organo-metal halide complex compound which is usually present as a brown sludge-like mass suspended in the reaction liquor. For example, in the preparation of alkylated aromatic compounds according to the Friedel-Crafts synthesis, the usual procedure is to introduce an olefin or alkyl halide into an agitated mixture of an aromatic hydrocarbon or halo-hydrocarbon and such an organo-metal halide complex catalyst. Then, when the desired amount of alkylating agent has been added, agitation of the reaction mixture is discontinued. The major portion of the suspended catalyst settles to the bottom of the reaction vessel and may be withdrawn for reuse in subsequent alkylations. However, an appreciable quantity of the organo-metal halide complex catalyst never settles from the reaction liquor, but remains dissolved or otherwise dispersed in the crude reaction product, and cannot be removed by physical means.

The presence of dispersed catalyst in the crude product greatly complicates the separation and purification of the compounds formed in the reaction, particularly in large scale or continuous operation. Thus when attempt is made to separate the individual products by fractional distillation without first removing the dispersed organo-metal halide, this material tends to catalyze a decomposition and rearrangement of the alkylated products during the distillation process, and hence to reduce the yields of the desired compounds. Further, the dispersed catalyst itself tends to decompose on the heating surfaces of the distilling apparatus, forming tars and scaly deposits which decrease the rate of heat transfer through the still body and necessitate frequent cleaning operations.

To avoid these difficulties, it is customary to wash the crude product with an excess of cold water or aqueous alkali in order chemically to destroy the dispersed organo-metal halide complex prior to the distillation step. Unfortunately, this procedure is disadvantageous in that the addition of water or aqueous solutions tends to wet the crude product and hence necessitates the introduction of a drying operation before distillation. If the drying is not conducted with extreme care, equipment corrosion problems are encountered in the subsequent steps of the process. Moreover, the treatment with water frequently entails further difficulties resulting from emulsification of the aqueous phase in the crude product. All these drawbacks have seriously limited the application of the Friedel-Crafts reaction to industrial chemical syntheses.

The chief object of the present invention is to provide a method of removing the dispersed organo-metal halide complex catalyst from Friedel-Crafts reaction liquors which eliminates the distillation difficulties hereinbefore mentioned, and at the same time avoids the disadvantages of catalyst removal with water or aqueous solutions.

According to the invention, a dispersed organo-metal halide catalyst may be effectively removed from a Friedel-Crafts reaction liquor by treating the liquor with a small proportion of ethylene oxide. The dispersed organo-metal complex is thereby converted to a flocculent precipitate which has no catalytic properties and does not interfere with subsequent distillation or other treatment of the crude product.

For example, in an alkylation process utilizing the invention, an olefin or alkyl halide is first reacted with an aromatic hydrocarbon or halohydrocarbon according to the usual Friedel-Crafts reaction procedures, in either a batchwise or continuous process. The resulting reaction liquor is usually allowed to stand for some time to permit settling and removal of the bulk of the sludge-like organo-metal halide catalyst, although this step is not essential. Then, according to the invention, the crude reaction product containing the remaining dispersed organo-metal halide complex catalyst is mixed with a small proportion of ethylene oxide. This reagent reacts rapidly with the dispersed catalyst complex to form a flocculent precipitate which settles to the bottom of the reaction vessel and may be removed, if desired, by filtration or otherwise. The crude alkylation liquor thus treated may be fractionally distilled in the customary manner to separate the alkylated products without danger of catalytic decomposition.

In practice, the ethylene oxide may be added as such to the crude reaction liquor or it may be dissolved in any suitable non-aqueous solvent miscible with the reaction liquor, preferably in an aromatic hydrocarbon such as benzene. The flocculent precipitate formed in the treatment resembles a metal hydroxide in its physical characteristics. The chemical identity of the material has not been clearly established.

The exact proportion of ethylene oxide to be added in the process cannot be stated in advance since it depends upon the particular reaction being carried out, the precise nature of the catalyst employed, the concentration of catalyst, and the reaction conditions. In practice, the ethylene oxide is added in small portions until further addition does not result in the formation of additional precipitate. A slight excess of the reagent is not disadvantageous. In general, an amount is required corresponding to between about 0.2 and about 12.0 gram-moles of ethylene oxide per gram-atom of metal present in the catalyst to be removed. When the dispersed catalyst complex is present in ordinary concentration, i. e. after the bulk of the catalyst has been allowed to settle out, this proportion of ethylene oxide is equivalent to between about 0.005 and about 1.0 part by weight of ethylene oxide per 100 parts of crude reaction liquor. In practice, it is not usually necessary to adjust the temperature of the crude product before the ethylene oxide is added since the process is operable at any temperature between about 0° C. and about 150° C. In many instances, however, e. g. in the preparation of ethyl benzene by reacting ethylene with benzene in the presence of an aluminum chloride complex catalyst, temperatures of 10° C. to 75° C. are preferable.

The present process is particularly adapted to the removal of dispersed complex catalysts from alkylation liquors formed in the reaction of lower olefins or lower alkyl monohalides, such as ethylene, propylene, isobutylene, ethyl chloride, isopropyl bromide, mixtures of these substances, etc., with aromatic hydrocarbons or halohydrocarbons, such as benzene, ethylbenzene, chlorobenzene, isopropyl brombenzene, naphthalene, etc. The treatment is applicable to the removal not only of aluminum chloride complexes, but also of organo-metal halide complex catalysts formed from other metal halides of the Friedel-Crafts type, e. g. aluminum bromide, ferric chloride, stannic chloride, antimony trichloride, etc.

It will be appreciated from the foregoing that the invention provides a simple process for removing dispersed organo-metal halide complex catalysts from Friedel-Crafts reaction liquors and hence eliminates the distillation difficulties inherent in prior art procedures. At the same time the new process is operated under anhydrous conditions, and thus avoids the disadvantages of catalyst removal by the use of aqueous solutions.

Other modes of applying the principle of the invention may be employed instead of those explained, change being made as regards the details hereinbefore disclosed, provided the steps stated by any of the following claims or the equivalent of such stated step or steps be employed.

I claim:

1. The process for removing a dispersed organo-metal halide complex catalyst of the Friedel-Crafts type from a Friedel-Crafts reaction liquor which comprises treating said liquor with a small proportion of ethylene oxide.

2. The process for removing a dispersed organo-metal halide complex catalyst of the Friedel-Crafts type from a Friedel-Crafts reaction liquor which comprises treating said liquor at a temperature between about 0° C. and about 150° C. with ethylene oxide in the proportion of between about 0.005 and about 1.0 part by weight of said reagent per 100 parts of crude liquor.

3. The process for removing a dispersed organo-metal halide complex catalyst of the Friedel-Crafts type from a Friedel-Crafts reaction liquor which comprises treating said liquor at a temperature between about 0° C. and about 150° C. with ethylene oxide in the proportion of between about 0.2 and about 12.0 gram-moles of said reagent per gram-atom of metal present in the organo-metal halide catalyst dispersed in said liquor.

4. In a process for the preparation of alkylated aromatic compounds wherein an alkylating agent selected from the class consisting of lower olefins and lower alkyl monohalides is reacted with a compound selected from the class consisting of aromatic hydrocarbons and halo-hydrocarbons in the presence of an organo-metal halide complex catalyst of the Friedel-Crafts type to form a crude alkylated product, and wherein the major portion of said catalyst is then separated from the crude product, the step of removing any remaining dispersed organo-metal halide complex catalyst from the crude alkylated product which comprises treating said crude product with a small proportion of ethylene oxide.

5. In a process for the preparation of alkylated aromatic compounds wherein an alkylating agent selected from the class consisting of lower olefins or lower alkyl monohalides is reacted with a compound selected from the class consisting of aromatic hydrocarbons and halo-hydrocarbons in the presence of an aluminum chloride complex catalyst of the Friedel-Crafts type to form a crude alkylated product, and wherein the major portion of said catalyst is then separated from the crude product, the step of removing any remaining dispersed aluminum chloride complex catalyst from the crude alkylated product which comprises treating said crude product with a small proportion of ethylene oxide.

6. In a process for the preparation of ethylbenzene wherein ethylene is reacted with benzene in the presence of an aluminum chloride complex catalyst of the Friedel-Crafts type to form crude ethylbenzene and wherein the major portion of said catalyst is then separated from the crude ethylbenzene, the step of removing any remaining dispersed aluminum chloride complex catalyst from the crude ethylbenzene which comprises treating said crude ethylbenzene with a small proportion of ethylene oxide.

7. In a process for the preparation of ethylbenzene wherein ethylene is reacted with benzene in the presence of an aluminum chloride complex catalyst of the Friedel-Crafts type to form a crude ethylbenzene and wherein the major portion of said catalyst is then separated from the crude ethylbenzene, the step of removing any remaining dispersed aluminum chloride complex catalyst from the crude ethylbenzene which comprises treating said crude ethylbenzene at a temperature between about 10° C. and about 75° C. with ethylene oxide in the proportion of between about 0.005 and about 1.0 part of ethylene oxide per 100 parts of crude ethylbenzene.

8. In a process for the preparation of ethylbenzene wherein ethylene is reacted with benzene in the presence of an aluminum chloride complex catalyst of the Friedel-Crafts type to form a crude ethylbenzene and wherein the major portion of said catalyst is then separated from the crude ethylbenzene, the step of removing any remaining dispersed aluminum chloride complex catalyst from the crude ethylbenzene which comprises treating said crude ethylbenzene at a temperature between about 10° C. and about 75° C. with ethylene oxide in the proportion of between about 0.2 and about 12.0 gram-moles of ethylene oxide per gram-atom of aluminum present in the organo-aluminum chloride catalyst dispersed in said crude ethylbenzene.

HAROLD A. ROBINSON.